United States Patent Office 3,445,260
Patented May 20, 1969

3,445,260
METHOD OF COLOR COATING BLOATED AGGREGATE
Philip W. Peter, 128 San Diego,
San Clemente, Calif. 92672
No Drawing. Filed June 9, 1966, Ser. No. 556,256
Int. Cl. C03c 17/04
U.S. Cl. 117—23                    8 Claims

ABSTRACT OF THE DISCLOSURE

A method of coating a bloated ceramic aggregate with a ceramic glaze in which a glazing composition forming a glaze at a temperature below the setting temperature of the aggregate is applied as a coating thereto at an elevated temperature in a range between the bloating temperature of the aggregate and the glazing temperature of the glazing composition.

---

This invention relates to a method of coloring lightweight, so-called "bloated," ceramic aggregate.

As pointed out in Harlan Patent No. 3,198,656, some clays and like inorganic vitrifiable raw materials, when crushed and sized or otherwise formed into small pellets or particles and subsequently fired under controlled conditions, will expand to form a lightweight cellular aggregate, known as "bloated" aggregate. Two types of bloated aggregate have been produced, one having a relatively smooth glazed surface coating substantially impenetrable by water and the other having a porous surface and capable of absorbing sufficient moisture to have a greater density than water. Due to the largely unexplained differences in the physical and chemical structures of the cell walls and surfaces of bloated aggregate from the structure of conventional unbloated or noncellular ceramic particles produced from the same raw materials, conventional techniques appeared inapplicable and, prior to the invention of the Harlan patent, bloated aggregate had been used uncolored, mainly as a lightweight aggregate in concrete in applications in which coloring was unimportant.

The disclosure in the Harlan patent that both types of bloated aggregate could be given colored coatings, opened fields of use from which it had previously been barred by lack of color, even though its lightness in weight would definitely have been advantageous. Thus, for example, it was feasible to use bloated aggregate, colored in accordance with the Harlan invention, as roofing granules, with consequent saving over the relatively heavy conventional granules in both shipping cost and the cost of the roof structure required to support the load.

In the method disclosed in the Harlan patent, a vitrifiable or firable mixture, preferably formed largely of a powdered frit and of a chemical composition to produce a glaze of the desired color, is mixed with sufficient water to form a glazing composition of substantially the viscosity of conventional paint. This composition is applied at room temperature to the previously produced aggregate in any of several ways suitable for uniformly coating the aggregate particles. The coated particles are then fired under controlled conditions for raising their temperatures slowly to drive off the water carrier and ultimately reach the vitrifying or glazing temperature of the glazing content of the particular glazing composition. To preserve the integrity of the aggregate particles, the glazing content not only must produce a glaze of the desired color but must be vitrifiable at a temperature below that at which the particles themselves would be adversely affected.

The primary object of the present invention is to provide an improved method of color coating bloated aggregate by forming a color glaze thereon, wherein the glazing composition is applied to the particles at a time when they are at a temperature below the bloating temperature of the aggregate and at or above the lower glazing temperature of the glaze-forming content of the composition, thereby minimizing the time lapse between application of the composition to and forming of the glaze on the particles.

Another object of the invention is to provide an improved method of forming a colored glaze on bloated aggregate, wherein by applying the glazing composition during cooling of the particles in the course of their production at a time when the particles are at an elevated temperature in the range between the bloating temperature of the aggregate and the lower glazing temperature of the glaze-forming content of the composition, the time and expense are avoided of the refiring required to form a glaze on particles to which a glazing composition is applied after they have been produced.

An additional object of the invention is to provide an improved method of forming a colored glaze on bloated aggregate, whereby the glazing composition is enabled to be applied in either powder or liquid form and, by applying the composition to the particles during tumbling thereof and at a time when they are at an elevated temperature in the range between the bloating temperature of the aggregate and the glazing temperature of the glaze-forming content of the composition, the particles are uniformly glazed with no agglomeration and a minimum loss of the glazing composition through wear prior to glazing.

Other objects and advantages of the invention will appear hereinafter in the detailed description and be particularly pointed out in the appended claims.

Bloated aggregate is produced from inorganic vitrifiable raw materials, such as certain clays and shales, which on firing under controlled conditions, release volatile chemical constituents. In manufacturing the bloated aggregate, the bloatable raw material is crushed and sized or otherwise formed into small pellets, balls or other particles, usually of ¾ in. or less diameter. On firing under controlled conditions the particles expand or bloat, usually more than doubling their initial diameter. Generally, the bloating occurs in a range from about 1500° F. to about 2000° F. After firing or heating to this temperature, the particles are air cooled down to room temperature. The resulting particles, making up the lightweight aggregate known as bloated aggregate, may be porous but ordinarily are rendered substantially impenetrable to moisture by having glazed or vitrified surfaces.

Conventional bloated aggregate has substantially the color of the raw material from which it was manufactured, and, as such, is mainly limited to use as a lightweight aggregate in cement. As pointed out in the Harlan patent, bloated aggregate can be given a wide range of colors by color coating to adapt it for uses in which decorative effects are desired, such as roofing granules and mosaics. The method of this invention colors bloated aggregate by coating it with a colored, moisture impervious, ceramic glaze. Also, for applications in which the aggregate, whether or not exposed, must be impervious to moisture to preserve its lightness, the method enables otherwise pervious aggregate to be rendered impervious by coating it with an impervious colored or even clear ceramic glaze. It differs from the method disclosed in the Harlan patent in minimizing the loss of glazing composition through wear by rubbing of the particles coated with it against each other and the container, by drastically reducing the time lag between the application of the composition to the aggregate and the formation of the glaze and, in its preferred form, also eliminates the need for reheating the aggregate to form the glaze by both applying the glazing composition and forming the glaze in the course of production of the aggregate.

To be usable in the method of this invention for glazing or color coating bloated aggregate, a glazing composition must have a glazing, glaze-forming or vitrification temperature which is below the herein termed "fixing" or "setting" temperature at which the aggregate itself will be adversely affected by change or alteration of its surface or internal structure. The glazing material preferably is applied in the course of producing the bloated aggregate during a cooling or temperature-reducing stage, following the heating of the initial particles to bloating temperature, but can also be applied during reheating of previously produced aggregate, the criterion in either case being the application of the glazing material at a time when the aggregate is at an elevated temperature in the range between the bloating or lower setting temperature of the aggregate and still lower glazing temperature of the glaze-forming content of the glazing material.

In the preferred form of the method of this invention, in which the bloated aggregate is coated with a colored glaze as it is produced, small particles of the desired size range of the bloatable vitrifiable material are fired or heated to bloating temperature. The firing beneficially is performed as a continuous operation in a gas or oil-fired rotary kiln into one end of which the particles are fed and in which they are tumbled and progressively heated as they advance by gravity toward the zone of maximum temperature. After being heated to bloating temperature, the now bloated aggregate is cooled, initially to the point at which its surface and internal structures are fixed or set and ultimately to room temperature. As during heating, the particles preferably are agitated by tumbling during cooling for uniformly exposing them to the heat transfer medium and preventing any tendency to agglomerate while their surfaces are soft. This is readily accomplished by transferring the particles discharged from the rotary kiln directly to a rotary cooler in which the particles are tumbled and exposed to forced air and progressively cooled before being discharged.

In the usual production of uncolored aggregate, the aggregate would simply be cooled as it passed through the cooler, and on discharge therefrom, would be sized and packaged according to size for sale. However, in accordance with the preferred form of the method of this invention, the aggregate during cooling is coated with a colored glaze so as to be discharged as an aggregate of the desired color. In order to form a glaze, the glazing composition must be applied at a point or zone at which the aggregate is at or above the glazing temperature of the composition's glaze-forming content and the glazing temperature of the composition must be below the setting temperature of the aggregate. However, since the aggregate is then in process of cooling from bloating temperature, it will not be adversely affected if the glazing composition is applied to it at a higher temperature and even at or above its setting temperature, so long as the presence of the composition at the applied temperature will not interfere with setting of the aggregate or the ability of the particular composition subsequently to form the desired glaze at its lower glazing temperature.

As is the usual practice in glazing ceramics, the glaze-forming content or glazing mixture or medium of the glazing composition or material, for uniformity of the glaze, preferably is largely or entirely a powdered frit. Conventionally, this powder would be mixed with water to form a liquid slip for application as a coating to the ceramics to be glazed. In the method of this invention, too, the glazing composition can be applied in liquid form, but, because of the elevated temperature at which it is applied, it can also be applied as a powder, thus enabling a dry powdered glazing mixture of the required chemical composition and physical properties, to be applied directly to the aggregate. Whether powder or liquid, the glazing composition is applied to the aggregate by introducing or injecting it into the rotary cooler or other container in which the aggregate is being cooled at a point or zone at which the aggregate is at or above the glazing temperature of the particular composition or its glaze-forming content. If, as preferred, the cooling is performed in a rotary cooler, a nozzle or other suitable injecting or introducing means, suitably insulated, can be mounted within the cooler in or at the required temperature zone, with the pressure for the injection supplied by compressed air for the powder and a suitable pump for the liquid.

The preferred tumbling of the aggregate during the application will expose the entire surface of each particle for coating by the composition and, since at the temperature of the application the powder on contact with the aggregate will melt or become fluid, capillary action will assist the tumbling in uniformly coating each particle, regardless of the form in which the glazing composition is applied. The elevated temperature responsible for the change in form of the powder will also drive off the liquid carrier of the liquid form substantially on contact with the aggregate. Continued cooling of the aggregate after application of the glazing composition will set the glaze and if, contrary to those of the examples of the Harlan patent, the particular glaze has any tendency to cause agglomeration, the preferred agitation by tumbling will prevent it.

While the preferred form saves the time and expense of reheating pre-produced bloated aggregate to coat it with a colored glaze, the time required for reheating, as well as loss of glazing composition attendant the application of the composition prior to the reheating by rubbing contact of the particles with each other and the container, can be drastically reduced by deferring application of the glazing composition to the bloated aggregate until it has been reheated at least to the glazing temperature of the particular composition. In this reheating form of the method, as in the method of the Harlan patent, it is neither necessary nor desirable that the temperature of the aggregate be raised to the point at which the surface and internal structures of the aggregate will be adversely affected. Except that the aggregate is heated up to rather than cooled down to the temperature at which the glazing composition is applied, the two forms of the present method are identical and, with this exception, the description of the first is equally applicable to this second or reheating form.

To be usable in the method of this invention, a glazing composition may have any chemical formulation or composition that will give it a glazing temperature below the setting temperature of the particular bloated aggregate to which it is applied and also render it capable of producing, for decorative aggregate, a glaze of the desired color upon the aggregate as a result either of the initial chemical composition of its glazing content or of the change wrought in that composition by exposure to the elevated temperature at which it is applied in the usually oxidizing or other suitable atmosphere in which the cooling or reheating of the aggregate is conducted. Since meeting both of these requirements with respect to the particular bloated aggregate to which they are applied, the exemplary glazing compositions of the Harlan patent are equally exemplary of those usable in the present method, except that the water content will be eliminated when the glazing composition is applied in powder form. As previously pointed out, the savings in time and expense from the present method are greatest when the aggregate is color coated in the course of its production. However, to emphasize the difference between the present method and that of the Harlan patent, there is described below a specific example in which the method of this invention is employed in color coating the pre-produced bloated aggregate of the first example of the Harlan patent. As will be recognized, the described example conforms to Harlan's first example in the aggregate and the dry or glazing content of the glazing composition, and uses, as the temperature of application of the glazing composition to the aggregate, the temperature to which the aggregate is elevated in Harlan's first example in order to form the glaze.

In this example bloated aggregate particles ranging from about one inch to about two inches in diameter and having a vitrified surface appearance and the following chemical composition expressed as percent by weight: $SiO_2$, 54%; $Al_2O_3$, 16%; $Fe_2O_3$, 6.5%; CaO, 4%; MgO, 3%; $Na_2O$ and $K_2O$, 3%; and $TiO_2$, 1%, are fed into a rotary kiln and heated to a temperature of about 1418° F. On reaching that temperature and while being tumbled in the rotary kiln, the aggregate has applied to it, by a compressed air injection into the kiln, a glazing composition formed of the following ingredients in the stated proportions: 60 grams frit No. 33 (having the following composition by weight: 6.46% $Na_2O$; 59.17% PbO; 14.53% $B_2O_3$, and 19.84% $SiO_2$), 30 grams Kentucky No. 4 clay (containing 51.65% $SiO_2$ by weight), and 2½ grams of $CoCO_3$. After the aggregate particles are completely coated, they are removed from the kiln and air cooled to room temperature. The particles so obtained will be coated a light blue color, the coating having a glazed surface and the color being uniform.

From the above detailed description it will be apparent that there has been provided an improved method of color coating bloated aggregate, which, by applying a glazing composition producing a glaze of the desired color to the aggregate at substantially the glazing temperature of the composition, reduces both the time and the expense of the colored coating. It should be understood that the described and disclosed embodiments are merely exemplary of the invention and that all modification are intended to be included that do not depart from the spirit of the invention and the scope of the appended claims.

Having described my invention, I claim:

1. A method of coating with a ceramic glaze a bloated ceramic aggregate which is bloated at a bloating temperature and has a lower setting temperature below which its surface and internal structures are unaffected by heat, comprising applying as a coating to said aggregate a glazing composition capable of forming a glaze thereon at a glazing temperature below said setting temperature while said aggregate is being tumbled and at a temperature in a range between said bloating and glazing temperatures, and subsequently cooling said glazed aggregate.

2. A method according to claim 1, wherein the temperature range at which the glazing composition is applied is between the setting and glazing temperatures.

3. A method according to claim 2 of color coating the bloated aggregate, wherein the aggregate is produced from particles of bloatable vitrifiable material by heating to bloating temperature and subsequent cooling, the bloated particles are reheated to the temperature at which the glazing composition is applied and the glazing composition is capable of producing a glaze of the desired color.

4. A method according to claim 3 wherein the glazing composition is in powder form when applied to the aggregate.

5. A method according to claim 1 of color coating the bloated aggregate, wherein the aggregate is produced by heating bloatable vitrifiable particles of a predetermined size range to the bloating temperature thereof and thereafter cooling the bloated particles, and the glazing composition is applied and the glaze is formed within said temperature range during said cooling.

6. A method according to claim 5, wherein the glazing composition is in powder form when applied to the aggregate.

7. A methor according to claim 5, wherein the glazing composition is in liquid form when applied to the aggregate.

8. A method according to claim 5, wherein the temperature of the aggregate when the glazing composition is applied thereto is at about the glazing temperature of the composition.

References Cited

UNITED STATES PATENTS

| | | | |
|---|---|---|---|
| 1,925,065 | 8/1933 | Atkinson | 117—23 |
| 2,600,078 | 6/1952 | Schutte et al. | 117—100 X |
| 2,974,060 | 3/1961 | Dettling | 117—23 X |
| 3,198,656 | 8/1965 | Harlan | 117—125 X |

WILLIAM D. MARTIN, *Primary Examiner.*

M. R. P. PERRONE, *Assistant Examiner.*

U.S. Cl. X.R.

117—100, 109, 125